United States Patent
Choi

[19]

[11] Patent Number: 6,141,554
[45] Date of Patent: Oct. 31, 2000

[54] METHOD FOR PROCESSING HARD HANDOFF IN A DIGITAL COMMUNICATION SYSTEM

[75] Inventor: Hyuk-jung Choi, Sungnam, Rep. of Korea

[73] Assignee: Samsung Electronics Co., Ltd., Rep. of Korea

[21] Appl. No.: 09/206,413

[22] Filed: Dec. 7, 1998

[30] Foreign Application Priority Data

Dec. 9, 1997 [KR] Rep. of Korea .................... 97-66985

[51] Int. Cl.⁷ ................................................ H04Q 7/20
[52] U.S. Cl. .................... 455/436; 455/442; 455/443; 455/439
[58] Field of Search .................. 455/436, 437, 455/438, 439, 440, 441, 442, 443, 444; 370/332, 331

[56] References Cited

U.S. PATENT DOCUMENTS

| | | | |
|---|---|---|---|
| 5,239,667 | 8/1993 | Kanai | 455/10 |
| 5,278,991 | 1/1994 | Ramsdale et al. | 455/444 |
| 5,594,718 | 1/1997 | Weaver, Jr. et al. | 370/331 |
| 5,594,943 | 1/1997 | Balachandran | 455/33.2 |
| 5,680,395 | 10/1997 | Weaver, Jr. et al. | 370/331 |
| 5,682,380 | 10/1997 | Park et al. | 370/331 |
| 5,722,072 | 2/1998 | Crichton et al. | 455/437 |
| 5,737,704 | 4/1998 | Jin et al. | 455/450 |
| 5,790,528 | 8/1998 | Muszynski | 370/331 |
| 6,055,428 | 4/2000 | Soliman | 455/437 |

*Primary Examiner*—Nguyen Vo
*Assistant Examiner*—Duc Nguyen
*Attorney, Agent, or Firm*—Dillworth & Barrese

[57] ABSTRACT

Method for processing hard handoff to prevent unnecessary frequent hard handoffs using specific parameters after the first handoff is performed. The method includes the steps of establishing a Guard_Time period during which handoff is not performed when a mobile station moves slowly in an area in which the cell coverages of the serving and target base stations are overlapped; and establishing a Guard_Level value so that handoff is performed independent of the Guard_Time if the strength of the radio wave for the moving mobile station is less than the Guard_Level during said Guard_Time. The Guard Time period prevents hard handoff even when a base station controller receives a request for handoff based on information received from the moving mobile station. Although the base station controller prevents the hard handoff dependent on the Guard_Time, the base station controller permits soft handoff and softer handoff to occur normally. The Guard_Time and Guard_Level are set up according to the base station, the base station controller and the characteristics of the coverage area. The Guard_Time is set up by a system-operator and the Guard_Level is used in relation with the value of T_DROP.

11 Claims, 2 Drawing Sheets

FIG. 1 (CONVENTIONAL)
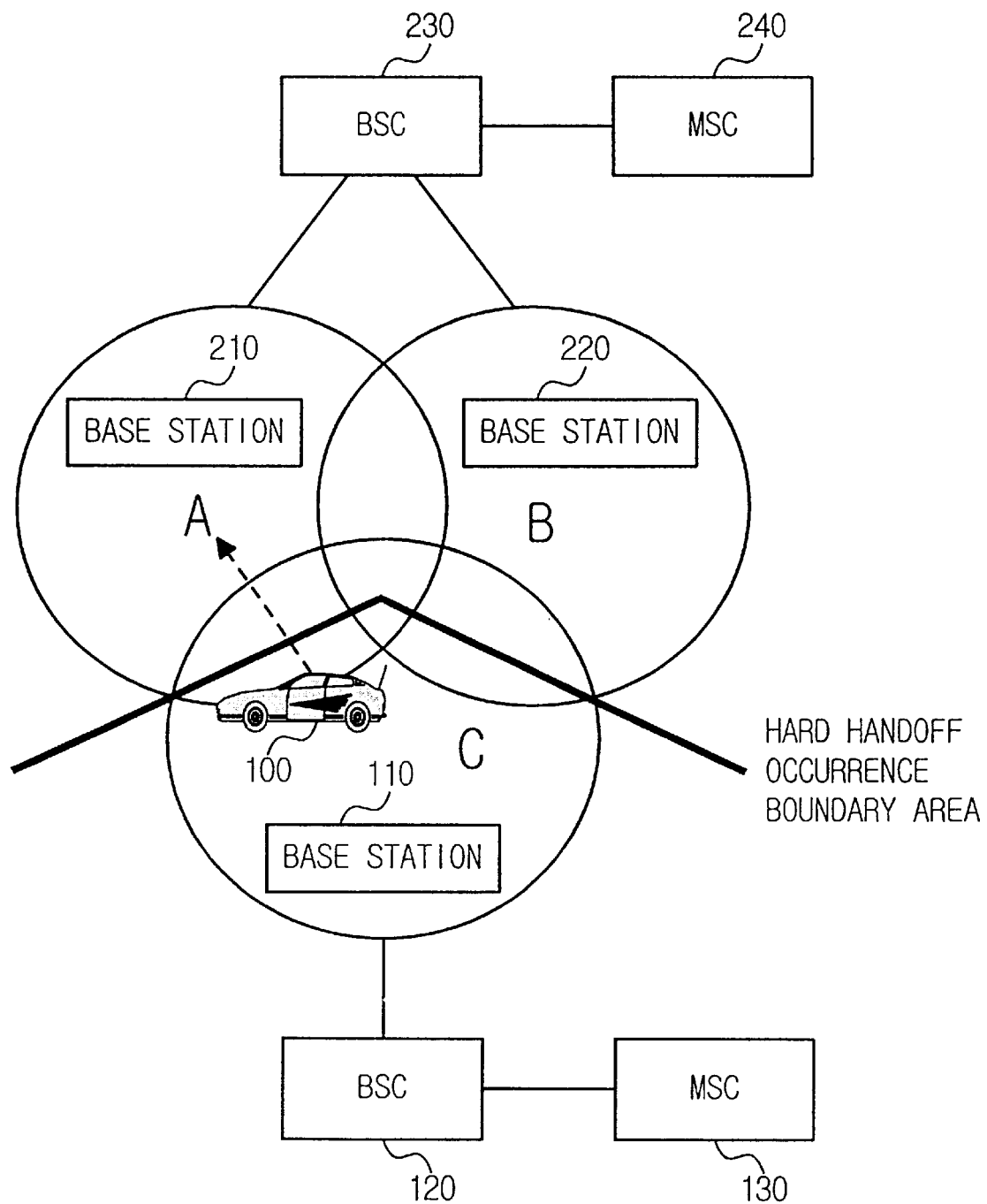

METHOD FOR PROCESSING HARD HANDOFF IN A DIGITAL COMMUNICATION SYSTEM

FIELD OF THE INVENTION

The present invention relates to digital mobile communication systems. More particularly, it relates to a method for processing hard handoff between a mobile station and base station in a digital mobile communication system.

DESCRIPTION OF THE RELATED ART

Generally, handoff in a digital communication system is performed when a mobile station travels from one serving base station to another target base station. Handoff is the process by which the base station and the mobile station maintain communications when the mobile station travels from one serving base station to another target base station. The types of handoff are soft handoff and hard handoff.

Soft handoff is a handoff that is performed without changing the frequency assignment and frame offset. Additionally, soft handoff is a handoff in which a mobile station moves into a different cell within a base station controller and a softer handoff is a handoff in which the mobile station moves into a different sector within the same cell. Hard handoff is a handoff that includes changing the frequency assignment, frame offset, pseudorandom-noise (PN) offset and the serving mobile switching center.

FIG. 1 shows a conceptual view illustrating a hard handoff between different mobile switching centers (MSC) 130 and 240. As mobile station 100 travels from area C, which is the cell coverage area being served by base station 110, to area A, which is the cell coverage area of the target base station 210, if mobile station 100 receives a radio wave having a strength that is more than a predefined value, T_ADD from the serving base station, the mobile station continues to send its information to the base station 110.

If the strength of the radio wave of the PN offset, which is included in the pilot strength measurement message (PSMM) received by the mobile station 100, is greater than a predefined threshold, T_COMP, base station controller 120 searches the information to perform the hard handoff. As a result of the search, if the PN offset does not correspond to the serving base station 110 of a mobile switching center 130 but to target base station 210 of another mobile switching center 240, base station controller 120 sends a request to mobile switching center 130 in which the base station controller 120 is included. The mobile switching center 130 then sends the request to the mobile switching center 240. The mobile switching center 240, having received the request, sends the request to base station controller 230. Base station controller 230 reserves base station 210 to prepare for handoff of mobile station 100 and responds to mobile switching center 240. Mobile switching center 240, having received the response, passes the response over to mobile switching center 130 that has requested the handoff.

After receiving the response, mobile switching center 130 then responds to the base station controller 120 again. Base station controller 120, which had requested the handoff, determines that base station 210, included in the another mobile switching center 240, has been prepared for the handoff and sends a handoff direction message (HDM) to the mobile station. Mobile station 100 receives the message, synchronizes to the base station 210, and then sends a handoff completion message (HCM) to the base station controller 230. The base station controller 230 having received the message, advises the mobile switching center 240 that the handoff of the mobile station 100 has been normally performed. Once the mobile switching center 240 advises the mobile switching center 130 of the above result, the mobile switching center 130 advises base 120, which then releases all resources having been assigned to mobile station 100. Base station 110 also releases its resources assigned to mobile station 100. After the above steps are performed, the serving base station for mobile station 100 is changed from base station 110 to base station 210. Additionally, the radio wave, which serves the mobile station, is changed from the radio wave of base station 110 to the radio wave of base station 210. After the hard handoff is successfully achieved, if the mobile station again receives a radio wave of a base station included in an another mobile switching center, and the radio wave has a value more than a specific value, the hard handoff is immediately performed again.

As stated above, conventionally, the hard handoff is immediately performed as would a soft handoff, without any particular consideration. The parameter which the base station controller uses to determine the hard handoff is the strength of PN offset in the pilot strength measurement message (PSMM) message received in accordance with the predetermined values, T_ADD and T_COMP by the mobile station. Therefore, if the base station controller unconditionally performs the hard handoff, the success rate of hard handoff is less than the success rate of soft handoff, and the quality of voice received decreases in the mobile station as a result of the frequent hard handoff.

In addition, the unconditionally performed hard handoff causes an overload to the base station controller and the base station as well as the target mobile switching center. Consequently, this affects the performance of the overall system. The problems in the conventional method as stated above are summarized as follows:

First, the value of strength of the present pilot in the pilot strength measurement message (PSMM) is the only parameter used in determining whether or not to perform hard handoff of the mobile station. Therefore, it is difficult for a mobile station to maintain a stable call under the rapidly changing circumstances.

Second, the base station controller determines the hard handoff using only the predetermined values of T_ADD and T_COMP, so if a mobile station is in an overlapping area in between the cell of serving base station and the cell of target base station being included in another mobile switching center, the measurements associated with the radio wave more easily reach the predefined values of the mobile station and cause unnecessary hard handoff on a constant basis.

Third, the hard handoff between mobile switching centers, in its characteristics, has the lower success rate than the soft handoff, so when the hard handoffs are performed frequently, it is difficult to maintain a stable call of a mobile station.

Fourth, when a mobile station performs hard handoffs constantly, the mobile switching center, base station controller and the base station should allocate resources for the corresponding services. Consequently, the conventional method is not profitable with respect to resource-effectiveness.

Fifth, when a mobile station performs hard handoffs constantly, the mobile switching center, base station controller and the base station have definite overloads, which affects the overall performance.

SUMMARY OF THE INVENTION

The present invention is intended to provide method for processing hard handoffs being performed between a mobile station and base station in a digital mobile communication system. The method for processing hard handoff prevents unnecessary frequent hard handoffs using specific parameters after the first handoff is performed.

For solving the conventional problems, when a mobile station travels from a cell coverage area being served by a base station belonging to a mobile switching center, to the cell coverage area of a target base station belonging to another mobile switching center, a preferable embodiment of the method for processing hard handoff according to the present invention comprises the steps of:

establishing a Guard_Time during which handoff is not performed while a mobile station moves slowly in an area in which the cell coverage of the serving and target base stations are overlapped, even though a base station controller receives a request for handoff based on the information received from the moving mobile station; and establishing a Guard_Level as a specific value so that handoff is performed independently of the Guard_Time if the strength of the radio wave for the moving mobile station is less than the Guard_Level during said Guard_Time.

According to the method of present invention, even though the base station controller prevents the hard handoff in dependence on the Guard_Time, the base station controller permits soft handoff to occur normally.

In one embodiment, it is preferable that the Guard_Time and Guard_Level are set up according to the base station, the base station controller and the characteristics of the area. The Guard_Time may be set up by a system-operator, and the range of the Guard_Time can be set up between 0 to 60 seconds in accordance with another embodiment.

According to another embodiment of the present invention, it is preferable that the Guard_Level is used as an interrelation with the value of T_DROP and the Guard_Level has a value from −20 dB to −5 dB.

Other objects and advantages of the invention will become apparent upon reading the detailed description and upon reference to the drawings.

BRIEF DESCRIPTION OF THE DRAWINGS

FIG. 1 shows a structural view illustrating a cell-structure in which hard handoff between mobile switching centers can occur;

DESCRIPTION OF PREFERRED EMBODIMENTS

Figure 2:
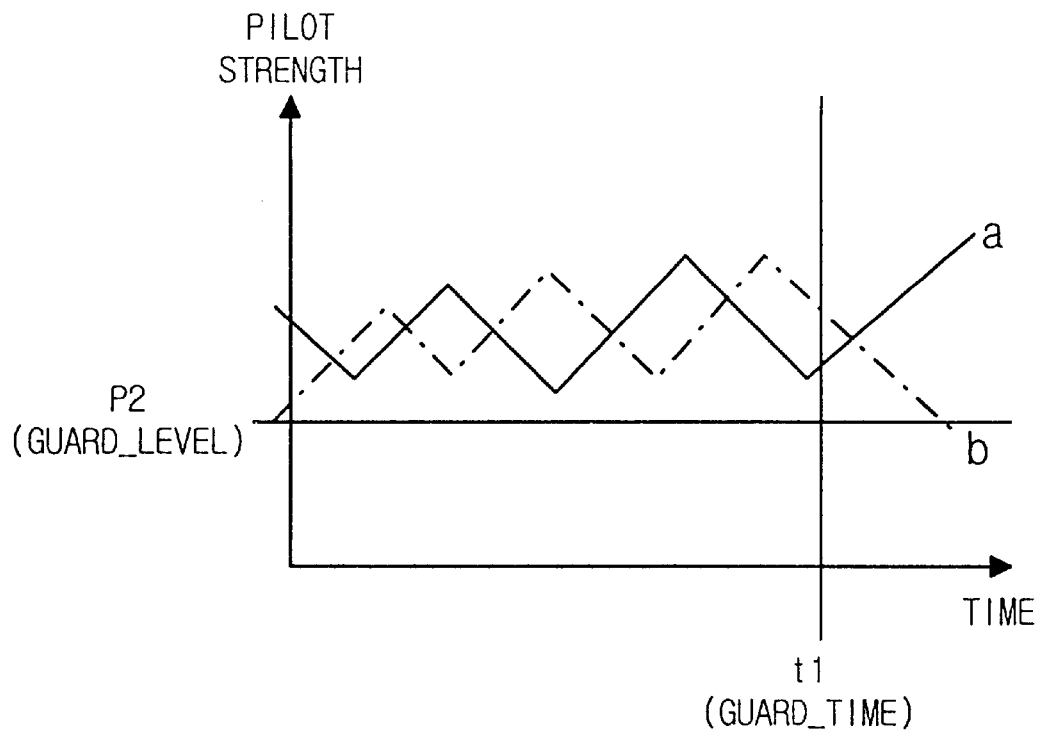
FIG. 2 is a graphical representation illustrating the method for processing and controlling hard handoff using a Guard_Level and a Guard_Time value according to an embodiment of the invention.

A preferable embodiment of the method for processing hard handoff between a mobile station and base station in a digital mobile communication system is as follows.

When a mobile station travels from a cell coverage area being served by a base station belonging to a mobile switching center, to a cell coverage area of a target base station belonging to another mobile switching center a Guard_Time is established as specific time period in which handoff is not performed when a mobile station moves slowly in an area in which the cell coverage area of the serving and target base station are overlapped. Hard handoff is not performed during the Guard_Time even though a base station controller receives a request for in handoff based on the information received from the moving mobile station. A Guard_Level is established as specific value which is used to enable handoff to be performed independently of the Guard_Time if the strength of the radio wave for the moving mobile station is less than the Guard_Level during the Guard_Time.

Although the base station controller prevents the hard handoff dependent on the established Guard_Time, the base station controller permits soft handoff and softer handoff to occur normally. In another embodiment, the Guard_Time and Guard_Level are set up according to the base station, the base station controller and the characteristics of the coverage areas. In another embodiment, the Guard_Time is set up by a system-operator, and it is preferably in the range of between 0 to 60 seconds.

The established Guard_Level is used in relation with the value of T_DROP, and is preferably a value from −20 dB to −5 dB.

FIG. 1 shows a structural view illustrating a cell-structure in which hard handoff between mobile switching centers can occur. As illustrated in FIG. 1, when mobile station 100 travels from a cell area C, of a serving base station 110, to a cell area A of a target base station 210, the mobile station 100 sends information relating to the strength of radio wave that the mobile station 100 is currently receiving from the serving base station 110. The base station controller 120 receives this signal strength information and determines whether a handoff is to be performed and which handoff is to be performed.

As illustrated in FIG. 1, if a hard handoff between mobile switching centers occurs, the mobile station 100 receives service through base station controller 230 and base station 210 which are included in the mobile switching center 240 when passing over the cell area A. Once the hard handoff is successfully performed, the mobile station receives the pilot waves from the base station 210 serving the cell area A and base station 110 serving the cell area C, simultaneously. In the above case, the mobile station may receive powerful radio waves from the target base station rather than the serving base station.

FIG. 2 shows a view illustrating the control of hard handoff using the Guard_Level and Guard_Time in accordance with an embodiment of the invention. As illustrated, it is possible for the strength of pilot wave "a" of the serving base station, and pilot wave "b" of the target base station to change suddenly. The base station controller prevents the mobile station from frequently leading to the hard handoff made in a short time by implementing a predefined Guard_Time t1, to maintain the stability of call. That is, the Guard_Time is a predefined specific time period in which hard handoff is not performed, even though the base station controller receives a request for handoff based on the information received by the mobile station.

Figure 3:
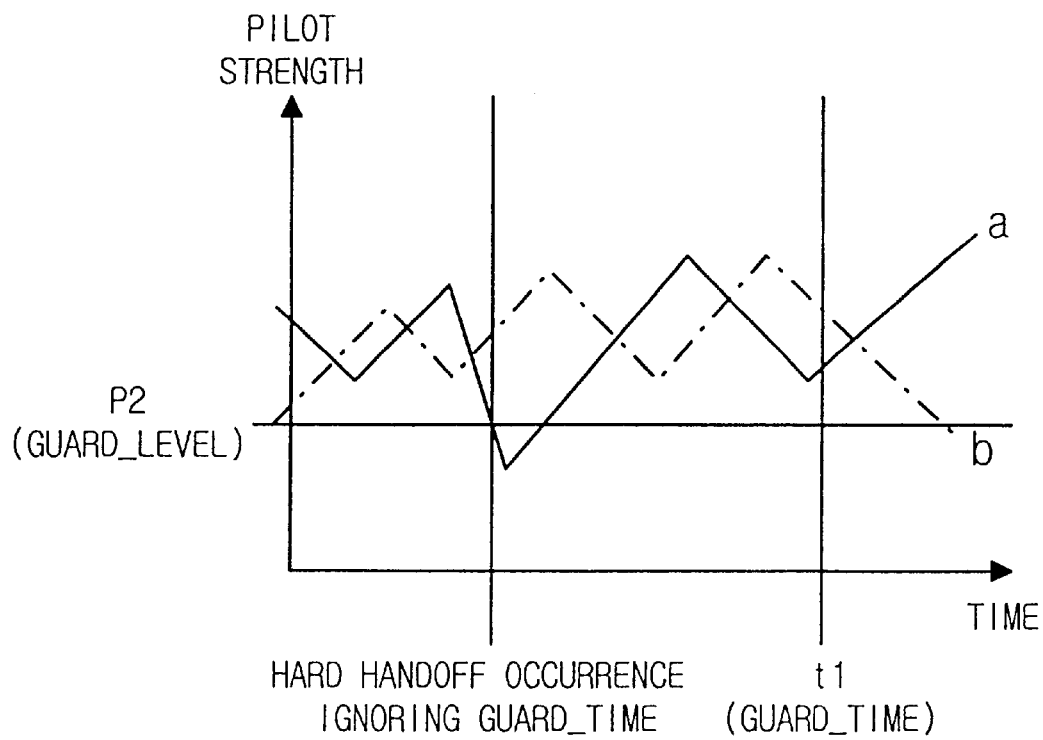
FIG. 3 is a graphical representation illustrating the method for performing hard handoff when the present pilot drops below the Guard_Level according to an embodiment of the invention.

FIG. 3 shows a graphical representation of the method for performing hard handoff when the present pilot drops below the Guard_Level P2. As illustrated, in the real operating circumstances, the pilot of the serving base station for the mobile station suddenly becomes poor during the Guard_Time period. Thus, if the pilot "a" of the base station drops below the predefined Guard_Level P2, hard handoff occurs regardless of the non-expiration of the Guard_Time period.

The base station controller restricts the hard handoff dependent on the established Guard_Time, however, the soft handoff and softer handoff occur normally so that the mobile station can maintain the stability of call and all of the other functions can work normally. The Guard_Time and Guard_Level are established according to the base station, the base station controller and the characteristics of the area.

The mobile station to which the Guard_Time is applied does not unconditionally perform a hard handoff when the pilot of the serving base station becomes momentarily poor, and the mobile station receives a more powerful pilot of the target base station so that the stability of call is maintained. As illustrated in FIG. 1, if the mobile station 100 travels from cell area A to the overlapping cell area B, soft handoff occurs. Consequently, it induces the mobile station to perform soft handoff rather than hard handoff, wherein the soft handoff is better in the success rate and the quality of voice received, so the mobile station can travel maintaining the stability of call. Additionally, the hard handoff does not constantly occur in a short time, so it is possible to reduce the termination of the call resulting from under performing of hard handoff.

The present invention as stated above has effects as follows.

First, as the invention does not simply consider the pilot strength information when performing hard handoff for a mobile station, it can induce soft handoff to be performed, which has the higher success rate and maintains the stability of call.

Second, by using an established Guard_Time, it is possible to maintain the stability of call by preventing the hard handoff from frequently occurring in a short time under the rapidly changing circumstances associated with the traveling mobile station.

Third, it is possible to induce the soft handoff rather than hard handoff wherein the hard handoff may cause a cut or break in the voice communication to maintain the quality of telephone conversation clearly.

Fourth, it is possible to satisfy the diverse conditions by performing hard handoff using the established Guard_Level if the level of the presently received pilot wave drops below the specific value, while the frequent occurrence of hard handoff within the handoff range is prevented.

Fifth, it is possible to save system resources by preventing unnecessary hard handoffs when a mobile station would otherwise frequently perform hard handoffs between mobile switching centers.

Sixth, it is possible to prevent overload to the system wherein the overload occurs by frequently performing the hard handoffs between mobile switching centers.

While the invention is susceptible to various modification and alternative forms, specific embodiments thereof have been shown by way of example in the drawings and will be herein be described in detail. It should be understood, however, that it is not intended to limit the invention to the particular forms disclosed, but on the contrary, the intention is to cover all modification, equivalents, and alternatives falling within the spirit and scope of the invention as defined by the appended claims.

What is claimed is:

1. A method for processing hard handoffs in a digital mobile communication system when a mobile station travels from a cell coverage area being served by a base station belonging to a mobile switching center to a cell coverage area of a target base station belonging to another mobile switching center, said method comprising the steps of:

establishing a Guard_Time period in which hard handoff is not performed when a mobile station moves into an area in which the cell coverage of said serving and target base stations are overlapped; and establishing a Guard_Level value at which hard handoff is performed independently of said established Guard_Time when the strength of a radio wave for said moving mobile station is less than said established Guard_Level during said Guard_Time.

2. The method as set forth in claim 1, further comprising the step of enabling said base station controller to perform soft handoff and softer handoff normally.

3. The method as set forth in claim 1, wherein said steps of establishing said Guard_Time and said Guard_Level are performed according to the base station, the base station controller and characteristics of the coverage area.

4. The method as set forth in claim 1, said step of establishing said Guard_Time is performed by a system-operator.

5. The method as set forth in claim 4, wherein said Guard_Time is set between 0 to 60 seconds.

6. The method as set forth in claim 1, wherein said established Guard_Level is used in relation with a value T_DROP.

7. The method as set forth in claim 6, wherein said Guard_Level has a value from −20 dB to −5 dB.

8. An apparatus for processing hard handoffs in a digital mobile communication system when a mobile station travels from a cell coverage area being served by a base station belonging to a mobile switching center to a cell coverage area of a target base station belonging to another mobile switching center, the apparatus comprising:

means for establishing a Guard_Time period in which hard handoff is not performed when a mobile station moves into an area in which the cell coverage of said serving and target base stations are overlapped; and means for establishing a Guard-Level value at which hard handoff is performed independently of said established Guard_Time when the strength of a radio wave for said moving mobile station is less than said established Guard_Level during said Guard_Time.

9. The apparatus of claim 8, further comprising means for enabling said base station controller for perform soft handoff and softer handoff.

10. The apparatus of claim 8, wherein said Guard_Time is set between 0–60 seconds.

11. The apparatus of claim 8, wherein said Guard_Level has a value from −20 dB to −5 dB.

* * * * *